(12) United States Patent
Kabuto

(10) Patent No.: US 8,677,438 B2
(45) Date of Patent: Mar. 18, 2014

(54) WIRELESS VIDEO TRANSMISSION DEVICE

(75) Inventor: Nôbuaki Kabuto, Kunitachi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 619 days.

(21) Appl. No.: 12/429,434

(22) Filed: Apr. 24, 2009

(65) Prior Publication Data

US 2010/0071018 A1    Mar. 18, 2010

(30) Foreign Application Priority Data

Sep. 16, 2008   (JP) .................................. 2008-235872

(51) Int. Cl.
  *H04N 7/173*        (2011.01)
(52) U.S. Cl.
  USPC ............................ 725/118; 725/119; 709/228
(58) Field of Classification Search
  None
  See application file for complete search history.

(56) References Cited

U.S. PATENT DOCUMENTS

2009/0210539 A1 *   8/2009   Funabiki et al. .............. 709/228

FOREIGN PATENT DOCUMENTS

| EP | 2 026 504 | 2/2009 |
|---|---|---|
| EP | 2 026 534 | 2/2009 |
| EP | 2026534 A1 * | 2/2009 |
| JP | 4116071 | 4/2008 |
| JP | 2008-153826 | 7/2008 |
| JP | 2008-153827 | 7/2008 |
| WO | WO 2007/136037 | 11/2007 |
| WO | WO 2007/136038 | 11/2007 |

\* cited by examiner

*Primary Examiner* — Cai Chen
(74) *Attorney, Agent, or Firm* — Antonelli, Terry, Stout & Kraus, LLP.

(57) ABSTRACT

After fixing the physical address of a wireless video transmission device to a route address or the like, it is possible to shorten the switchover time by having a conversion table provided that maps the physical addresses on the wireless video reception device side, since it does not occur that the addresses of AV equipment connected by wire with the wireless video transmission device are changed, even if the physical address of the wireless video reception device changes. Further, by performing split transfer of the CEC messages, it is possible to carry out transmission of the CEC messages promptly and to suppress reception confirmation bits with respect to CEC messages for which there exists no destination.

4 Claims, 8 Drawing Sheets

| NUMBER | EQUIPMENT (DEVICE) | ADDRESSES IN 11 | | ADDRESSES IN 12 | |
|---|---|---|---|---|---|
| | | LOGICAL ADDRESS | PHYSICAL ADDRESS | LOGICAL ADDRESS | PHYSICAL ADDRESS |
| 110 | Tx | — | 0.0.0.0 | — | 3.0.0.0 |
| 111 | STB | Tuner 1 | 1.0.0.0 | Tuner 2 | 3.0.0.0 |
| 112 | HDD | Recorder 1 | 1.1.0.0 | Recorder 2 | 3.0.0.0 |
| 113 | Amp | Audio | 1.2.0.0 | Audio | 3.0.0.0 |
| 114 | STB | Tuner 2 | 1.2.1.0 | Tuner 3 | 3.0.0.0 |
| 115 | DVD | Playback 1 | 1.2.2.0 | Playback 1 | 3.0.0.0 |
| 120 | Rx | — | 0.0.0.0 | — | 3.0.0.0 |
| 121 | Monitor | TV | 0.0.0.0 | TV | 0.0.0.0 |
| 122 | STB | Tuner 3 | 0.0.0.0 | Tuner 1 | 1.0.0.0 |
| 123 | HDD | Recorder 2 | 0.0.0.0 | Recorder 1 | 2.0.0.0 |

FIG.9

| NUMBER | EQUIPMENT | ADDRESSES IN 11 | | ADDRESSES IN 12 | |
|---|---|---|---|---|---|
| | | LOGICAL ADDRESS | PHYSICAL ADDRESS | LOGICAL ADDRESS | PHYSICAL ADDRESS |
| 110 | Tx | — | 0.0.0.0 | — | 3.0.0.0 |
| 111 | STB | Tuner 1 ⇒3 | 1.0.0.0 | Tuner 2 ⇒6 | 3.6.0.0 |
| 112 | HDD | Recorder 1 ⇒1 | 1.1.0.0 | Recorder 2 ⇒2 | 3.2.0.0 |
| 113 | Amp | Audio ⇒5 | 1.2.0.0 | Audio ⇒5 | 3.5.0.0 |
| 114 | STB | Tuner 2 ⇒6 | 1.2.1.0 | Tuner 3 ⇒7 | 3.7.0.0 |
| 115 | DVD | Playback 1 ⇒4 | 1.2.2.0 | Playback 1 ⇒4 | 3.4.0.0 |
| 120 | Rx | — | — | — | 3.0.0.0 |
| 121 | Monitor | TV ⇒0 | 0.0.0.0 | TV ⇒0 | 0.0.0.0 |
| 122 | STB | Tuner 3 ⇒7 | 0.0.0.0 | Tuner 1 ⇒3 | 1.0.0.0 |
| 123 | HDD | Recorder 2 ⇒2 | 0.0.0.0 | Recorder 1 ⇒1 | 2.0.0.0 |

FIG.11

| NUM-BER | EQUIP-MENT | ADDRESSES IN 11 | | ADDRESSES IN 12 | | ADDRESSES IN 13 | |
|---|---|---|---|---|---|---|---|
| | | LOGICAL ADDRESS | PHYSICAL ADDRESS | LOGICAL ADDRESS | PHYSICAL ADDRESS | LOGICAL ADDRESS | PHYSICAL ADDRESS |
| 110 | Tx | — | 0.0.0.0 | — | 3.0.0.0 | — | 2.0.0.0 |
| 111 | STB | Tuner1  =>3 | 1.0.0.0 | Tuner2  =>6 | 3.6.0.0 | Tuner3  =>7 | 2.1.0.0 |
| 112 | HDD | Recorder1  =>1 | 1.1.0.0 | Recorder2  =>2 | 3.2.0.0 | Recorder3  =>9 | 2.1.1.0 |
| 113 | Amo | Audio  =>5 | 1.2.0.0 | Audio  =>5 | 3.5.0.0 | Audio  =>5 | 2.1.2.0 |
| 114 | STB | Tuner2  =>6 | 1.2.1.0 | Tuner3  =>7 | 3.7.0.0 | Tuner4  =>10 | 2.1.2.1 |
| 115 | DVD | Playback1  =>2 | 1.2.2.0 | Playback1  =>4 | 3.4.0.0 | Playback2  =>8 | 2.1.2.2 |
| 120 | Rx | — | 0.0.0.0 | — | 3.0.0.0 | — | 0.0.0.0 |
| 121 | Monitor | TV  =>0 | 0.0.0.0 | TV  =>0 | 0.0.0.0 | TV  =>0 | 0.0.0.0 |
| 122 | STB | Tuner3  =>7 | 0.0.0.0 | Tuner1  =>3 | 1.0.0.0 | Tuner2  =>6 | 0.0.0.0 |
| 123 | HDD | Recorder2  =>2 | 0.0.0.0 | Recorder1  =>1 | 2.0.0.0 | Recorder2  =>8 | 0.0.0.0 |
| 130 | Tx | — | 2.0.0.0 | — | 3.0.0.0 | — | 0.0.0.0 |
| 131 | STB | Tuner4  =>10 | 2.1.0.0 | Tuner4  =>10 | 3.10.0.0 | Tuner1  =>3 | 1.0.0.0 |
| 132 | HDD | Recorder3  =>9 | 2.1.1.0 | Recorder3  =>9 | 3.9.0.0 | Recorder1  =>1 | 1.1.0.0 |
| 133 | DVD | Playback2  =>8 | 2.1.2.0 | Playback2  =>8 | 3.8.0.0 | Playback1  =>2 | 1.2.0.0 |

FIG.12

| NUMBER | EQUIPMENT | ADDRESSES IN 11 | | ADDRESSES IN 14 | | ADDRESSES IN 13 | |
|---|---|---|---|---|---|---|---|
| | | LOGICAL ADDRESS | PHYSICAL ADDRESS | LOGICAL ADDRESS | PHYSICAL ADDRESS | LOGICAL ADDRESS | PHYSICAL ADDRESS |
| 110 | Tx | — | 0.0.0.0 | — | 3.0.0.0 | — | 2.0.0.0 |
| 111 | STB | Tuner1 =>3 | 1.0.0.0 | Tuner1 =>3 | 3.3.0.0 | Tuner3 =>7 | 2.1.0.0 |
| 112 | HDD | Recorder1 =>1 | 1.1.0.0 | Recorder2 =>2 | 3.2.0.0 | Recorder3 =>9 | 2.1.1.0 |
| 113 | Amp | Audio =>5 | 1.2.0.0 | Audio =>5 | 3.5.0.0 | Audio =>5 | 2.1.2.0 |
| 114 | STB | Tuner2 =>6 | 1.2.1.0 | Tuner2 =>6 | 3.6.0.0 | Tuner4 =>10 | 2.1.2.1 |
| 115 | DVD | Playback1 =>2 | 1.2.2.0 | Playback3 =>8 | 3.8.0.0 | Playback2 =>8 | 2.1.2.2 |
| 140 | Rx | — | 0.0.0.0 | — | 2.0.0.0 | — | 0.0.0.0 |
| 141 | Monitor | TV =>0 | 0.0.0.0 | TV =>0 | 0.0.0.0 | TV =>0 | 0.0.0.0 |
| 142 | Game | Playback3 =>11 | 0.0.0.0 | Playback1 =>4 | 1.0.0.0 | Playback3 =>11 | 0.0.0.0 |
| 130 | Tx | — | 2.0.0.0 | — | 3.0.0.0 | — | 0.0.0.0 |
| 131 | STB | Tuner4 =>10 | 2.1.0.0 | Tuner4 =>10 | 3.7.0.0 | Tuner1 =>3 | 1.0.0.0 |
| 132 | HDD | Recorder3 =>9 | 2.1.1.0 | Recorder3 =>9 | 3.9.0.0 | Recorder1 =>1 | 1.1.0.0 |
| 133 | DVD | Playback2 =>8 | 2.1.2.0 | Playback3 =>11 | 3.11.0.0 | Playback1 =>2 | 1.2.0.0 |

WIRELESS VIDEO TRANSMISSION DEVICE

INCORPORATION BY REFERENCE

The present application claims priority from Japanese application JP2008-235872 filed on Sep. 16, 2008 and the content of which is hereby incorporated by reference into this application.

BACKGROUND OF THE INVENTION

1. Field of the Invention

The present invention pertains to technology for wirelessly transmitting messages, such as CEC (Consumer Electronics Control) defined by e.g. the HDMI (High-Definition Multimedia Interface) Specification, for controlling video equipment such as e.g. DVD (Digital Versatile Disc) players.

2. Description of the Related Art

Technology in which video frame signals are sent from a video transmission device to a video reception device and CEC messages determined by the HDMI Specification are communicated wirelessly, bi-directionally, between the video transmission device and the video reception device is disclosed in JP-B-4116071, JP-A-2008-153826, and JP-A-2008-153827. In JP-B-4116071, there is described technology of replying by proxy to the transmitting party with an ACK bit indicating that it has been possible to receive data such as the registration of physical addresses and logical addresses or a CEC message, in the case of wirelessly connecting a video transmission device and a video reception device.

Also, technology pertaining to the transmission and reception of similar CEC messages is described in JP-A-2008-153826 regarding the case of two video transmission devices and one video reception device, and in JP-A-2008-153827, regarding the case of one video transmission device and two video reception devices.

In any event, in case the connection configuration of a piece of video equipment (e.g. equipment outputting and receiving video images such as a DVD player, an HDD (Hard Disk Drive) recorder or an STB (Set Top Box) having a tuner; there also being cases hereinafter where these are called "AV equipment") connected with a video reception device changes and the physical address of the video reception device has changed, these also change the physical address of the video transmission device, being linked together. As for AV (audio-visual) devices connected by wire with the video transmission device, the physical addresses were changed sequentially in response to the change in the physical address of the video transmission device, and, in order to obtain compatibility of the physical addresses of the entire CEC system, some time was required until all the physical addresses had been determined.

Moreover, in JP-B-4116071 et cetera, it is described that, in the case of wirelessly transmitting a CEC message constituted by several bytes, a video transmission device (or a video reception device) with which a piece of AV equipment is connected by wire brings the CEC message to completion by replying by proxy with a reception confirmation ACK bit and further that, in order to avoid proxy replies to a CEC message toward the destination of a non-existing piece of AV equipment, the video transmission device (or video reception device), being the CEC message wireless transmission recipient, is served notice, in the case where the video reception device (or video transmission device) being the CEC message wireless transmission recipient is unable to receive a reception confirmation ACK bit from the destination of the CEC message, of the information about the same impossibility to receive, and the proxy reply operation destined for the corresponding address is stopped.

Here, the video transmission device (or video reception device) required time for checking that the destination piece of AV equipment did not exist and could not return a reception confirmation bit, in order to transmit in units of CEC messages composed of several bytes.

SUMMARY OF THE INVENTION

The aforementioned prior art has the following problems. First, there is the point that time is required for the determination of the physical addresses of the entire CEC system at the time when the physical address of the video reception device changes.

Second, there is the point that CEC message reception time is also necessary for the check as to whether there exists CEC message destination piece of AV equipment (reception confirmation ACK bit).

Third, there is the point that no consideration is given to transmitting and receiving video frame signals and CEC messages at a low cost.

The present invention is one that is formed by taking into consideration the aforementioned problems and provides, in a system carrying out transmission and reception of CEC messages wirelessly, technology that is capable of swiftly transmitting a CEC message, even if the physical address of the wireless video reception device changes. Also, the present invention provides technology that is capable of swiftly transmitting an ACK signal in response to the reception of a CEC message. Still further, the present invention provides technology for implementing a wireless video transmission system at a low cost.

The present invention, as described in the scope of patent claims, is one in which, together with fixing the physical address of a wireless video transmission device to a designated address, e.g. route address (0, 0, 0, 0), there is given, as the destination of a piece of second video equipment (or a second video device) connected with a wireless video reception device, included in a CEC message from a piece of first video equipment (or a first video device) connected with the wireless video transmission device, a logical address which is assumed to be incorporated into the concerned piece of second AV equipment.

Also, the present invention is one in which, in the case of receiving such a CEC message, the logical address of the piece of second AV equipment that is included herein is converted into the logical address of the piece of second AV equipment connected with the wireless video reception device and is transmitted to the recipient piece of second video equipment.

Moreover, the present invention is constituted so as to: include, in the aforementioned CEC message, a header block including video equipment logical addresses, a first data block following the concerned header block, and a second data block following the concerned first data block; respectively take the aforementioned first data block and second data block to be operation codes and operands serving as said control data; and, further, to respectively insert individually the aforementioned header block, first data block, and second data block in a vertical retrace interval of the aforementioned video frame signal to be transmitted wirelessly and transmit the same to the wireless video reception device.

In accordance with the configuration of the aforementioned present invention, there is the advantage that, by first fixing the physical address of the video transmission device, whether it be in the case where there is a variation in the configuration of the piece of video equipment connected by wire with the video reception device or the case where the video transmission destination is switched to a separate video reception device, the effort of collecting the physical address again can be eliminated, since the physical address of the video transmission device does not change and the transmission of the CEC message can be started rapidly.

Second, there is the advantage that, since it is possible to rapidly start transmission of the CEC message to the piece of AV equipment being the destination of the CEC message by transmitting by dividing up the wireless transmission units of the CEC message, it is possible for the destination AV equipment to quickly obtain the response result of the reception confirmation ACK bit, and erroneous reception confirmation ACK bit proxy responses can be reduced.

Third, since the CEC message is inserted by being divided up in the vertical retrace intervals of the video frame signal to be transmitted from the video transmission device to the video reception device, it becomes possible to transmit and receive the video frame signal and the CEC message by time division. Because of this, there is the advantage that it becomes possible to combine the video and CEC message wireless transmission circuits and that the wireless video transmission system can be implemented at low cost.

According to the present invention, it becomes possible to swiftly transmit CEC messages even if the physical address of the wireless video reception device changes. Also, it provides technology making it possible to swiftly transmit the ACK signal in response to a CEC message. Still further, in accordance with the present invention, a low-cost wireless video transmission system can be provided.

Other objects, features and advantages of the invention will become apparent from the following description of the embodiments of the invention taken in conjunction with the accompanying drawings.

BRIEF DESCRIPTION OF THE DRAWINGS

FIG. 9 is an example of a physical address and logical address conversion able (Embodiment 3).

FIG. 11 is an example of a physical address and logical address conversion table (Embodiment 4).

FIG. 12 is an example of a physical address and logical address conversion table (Embodiment 4).

DETAIL DESCRIPTION OF THE EMBODIMENTS

Hereinafter, a description regarding the embodiments concerned with the present invention will be given with reference to the drawings.

<<1. The First Embodiment>>

Figures 1, 2:
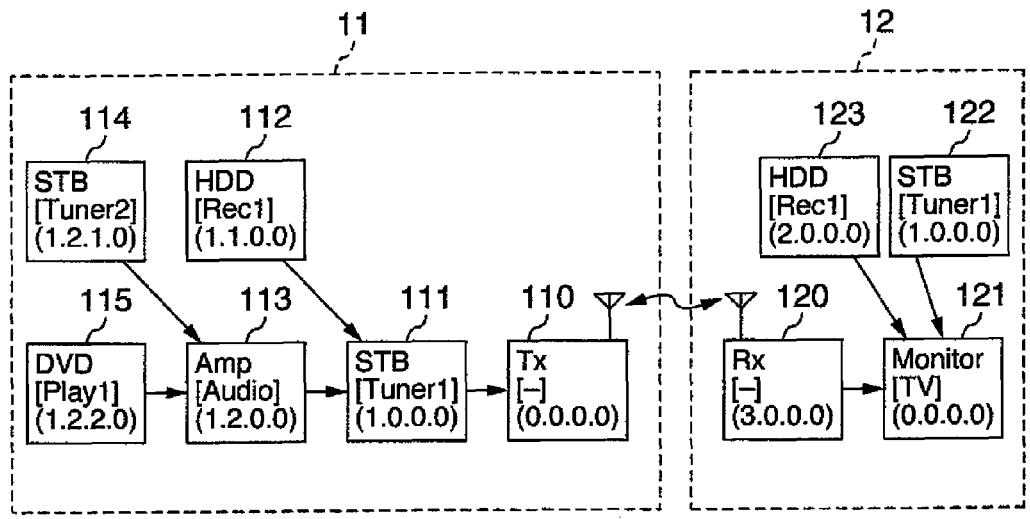
FIG. 1 is a block diagram showing the configuration of a system connecting AV equipment by wire and wirelessly (Embodiment 1).
FIG. 2 is an example of a physical address and logical address conversion table (Embodiment 1).

FIG. 1 is a block diagram showing the configuration of a system, connecting AV equipment by wire and wirelessly, which is the first embodiment associated with the present invention. In FIG. 1, a wireless video transmission device 110 and a wireless video reception device 120 correspond to a wireless communication system according to the embodiment of the present invention. The wireless video transmission system associated with the present embodiment has a first CEC system 11 and a second CEC system 12.

The first CEC system 11 is a CEC system on the side of wireless video transmission device 110, in which at least one piece of first AV equipment, e.g. an STB (111), an HDD recorder 112, an audio amplifier 113, an STB 114, and a DVD player 115, is connected by wire, with e.g. an HDMI cable. The arrows in the diagram indicate the transmission direction of the video frame signals connected by HDMI. The CEC messages have bi-directional transmission. The terms inside square brackets indicate logical addresses defined by HDMI and the terms inside round brackets indicate physical addresses. A dash inside square brackets indicates that a logical address has not been provided.

Here, there will be given a simple explanation regarding logical addresses and physical addresses occurring in CEC defined in the HDMI Specification. First, as for the logical addresses, in the current version of the Specification concerned with HDMI-CEC, it is decided to handle from 0 to 15 thereof, ending up having unique names inside the HDMI network. In the present embodiment, the result is that there are unique names in the respective first CEC system 11 and second CEC system 12. This logical address differs depending on the type of external equipment. E.g., in case the piece of external AV equipment is an STB (Set Top Box) having a tuner for digital broadcast reception, there is e.g. given "Tuner" as the logical address and in the case of an HDD recorder, "Recorder" is given.

Also, a physical address has a unique name inside the HDMI network, but if an external piece of AV equipment is subject to actions like being added to the HDMI network or cut off from it, it is automatically adjusted. The physical address is a five-layered address and is expressed with an (n, n, n, n) format composed of unique numbers n associated with identical layers. In case the layer of an external piece of equipment directly connected with the display device is taken to be the first layer, the external piece of equipment connected with this first-layer piece of equipment becomes the second layer, the layer numbers being gradually increased in accordance with being removed from the display device. And then, the aforementioned (n, n, n, n) format is expressed so that the layer number increases as one moves from the n on the left-hand side to the right.

E.g., a TV (television) set serving as a monitor is a route device and has a physical address "0, 0, 0, 0" serving as a route address. In the case where two external pieces of equipment are directly connected with this TV set, the physical address of the first external piece of equipment is expressed as "1, 0, 0, 0" and the physical address of the second external piece of equipment as "2, 0, 0, 0". And then, if three external pieces of equipment are connected with the second external piece of equipment, their respective physical addresses are expressed as "2, 1, 0, 0", "2, 2, 0, 0", and "2, 3, 0, 0".

By using a CEC message having a physical address and a logical address such as these, it is possible, even if several output devices are connected, to transmit a CEC message designating a specific one and including control data.

In the present embodiment, wireless video transmission device 110 normally sets the route address, i.e. (0, 0, 0, 0), as the physical address. This physical address is taken to have a fixed value which is not modified even if the external connection configuration changes. As a result, since it is not subject to any influence when the physical address of wireless video reception device 120 changes, it can operate stably. The physical address and logical address of each piece of AV equipment are set in accordance with the HDMI Standard, as illustrated.

Second CEC system 12 is a CEC system on the wireless video reception device 120 side and has at least one piece of second AV equipment connected by wire, e.g. a monitor (121) being a TV set, an STB 122, or a HDD recorder 123. For these as well, the physical address and logical address of each piece of AV equipment are set as illustrated, taking the physical address of TV (121) to be (0, 0, 0, 0) which is a route address, in accordance with the HDMI Standard.

An example of a physical address and logical address of each of the set pieces of AV equipment is shown in FIG. 2. The portions surrounded by double borders are portions in which pieces of AV equipment connected by wire in differing CEC systems are treated virtually. The pieces of first AV equipment connected by wire inside first CEC system 11, i.e. STB (111), HDD recorder 112, audio amplifier 113, STB 114, and DVD player 115, are, as equipment existing in the interior of wireless video reception device 120 inside second CEC system 12, virtually allocated the same physical address ((3, 0, 0, 0) in the present example) as that of wireless video reception device 120. Further, regarding respectively these pieces of first AV equipment, logical addresses that do not conflict with actually existing logical addresses in second CEC system 12 are allocated virtually. E.g., as for the logical address of STB (111) in second CEC system 12, the address "Tuner 2" is given, as shown in FIG. 2, since there already exists STB 122 inside second CEC system 12 and the logical address "Tuner 1" is given thereto. In FIG. 2, the physical addresses and logical addresses set virtually with respect to the pieces of first AV equipment are shown with double frames.

Similarly, the pieces of second AV equipment connected by wire inside second CEC system 12, i.e. monitor (121), STB 122, and HDD recorder 123, are, as equipment existing in the interior of wireless video transmission device 110 inside first CEC system 11, virtually allocated the same physical address ((0, 0, 0, 0) in the present example) as that of wireless video transmission device 110. Further, regarding respectively these pieces of second AV equipment, logical addresses that do not conflict with actually existing logical addresses in first CEC system 11 are allocated virtually. E.g., as for the logical address of STB 122 in first CEC system 11, the address "Tuner 3" is given, as shown in FIG. 2, since there already exist STB (111) and STB 114 inside first CEC system 11 and the logical addresses "Tuner 1" and "Tuner 2" are given thereto. In FIG. 2, the physical addresses and logical addresses set virtually with respect to the pieces of second AV equipment are similarly shown with double frames.

In this way, the physical address of wireless video transmission device 110 is fixed to e.g. (0, 0, 0, 0) and, if taking the summary table of physical addresses and logical addresses shown in FIG. 2 as a conversion table, no influence is exerted on the physical addresses inside CEC system 11 even in the case where the AV equipment connections inside CEC system 12 change and the physical address of wireless video reception device 120 changes, and there is the advantage that it is possible to shorten the time of no CEC response due to address variations without exerting any influence on the physical addresses inside CEC system 11, since it is sufficient to just overwrite only the aforementioned conversion table.

Figure 3:
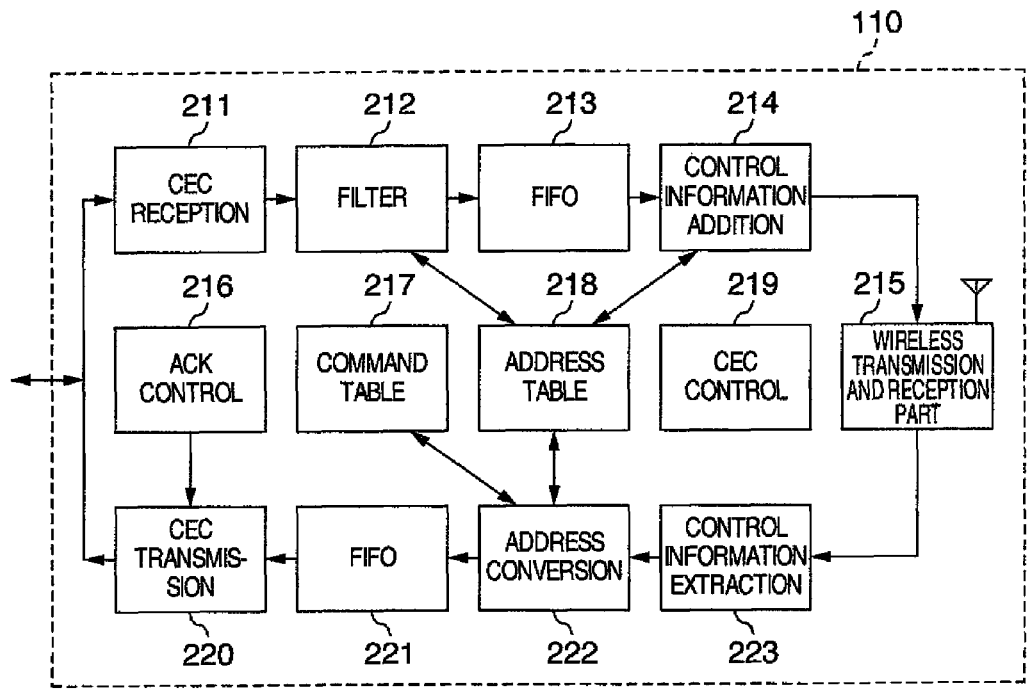
FIG. 3 is a block diagram showing the configuration inside a wireless video transmission device (Embodiment 1).

FIG. 3 shows a block chart related to a configuration for executing CEC processing used in wireless video transmission device 110, in which a CEC control part 219 controls the operation of each element in the concerned blocks. As for the configuration of such CEC processing, wireless video reception device 120 is also taken to have a similar configuration.

Figure 4:
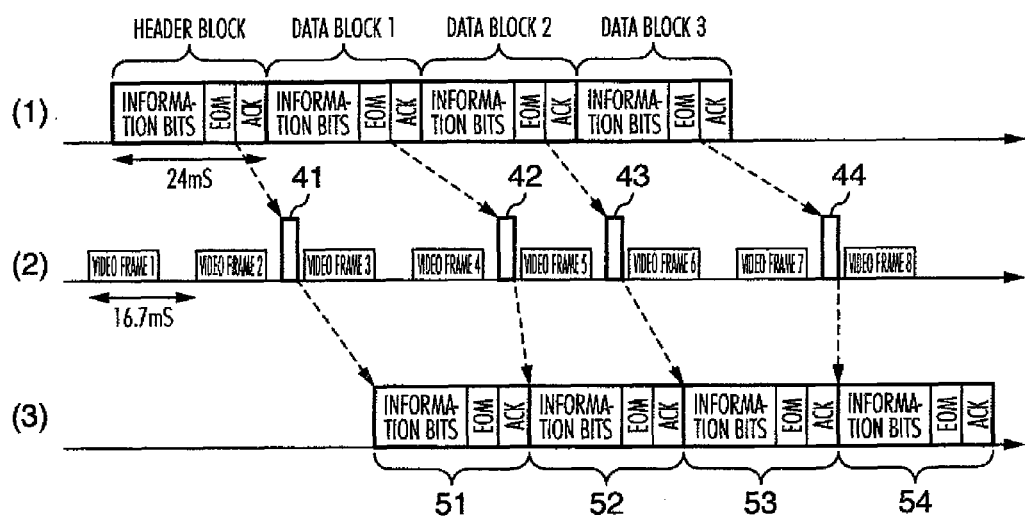
FIG. 4 is a sequence diagram showing the signals of each part of a wireless communication system (Embodiment 1).

FIG. 4 is a sequence diagram showing signals of each part of the wireless communication system, Part (1) expressing in a time series the sequence of CEC messages received by wireless video transmission device 110 from a piece of first AV equipment connected by wire with the concerned device 110. Part (2) is the sequence diagram of the wireless transmission and reception portion and Part (3) is one which shows the sequence of a CEC message issued by wireless video reception device 120 to a piece of second AV equipment connected by wire with the concerned device 120.

A CEC message, as shown in FIG. 4, is constituted by a plurality of concatenated data blocks consisting of one byte of information bits (i.e. Data), an EOM (End Of Message) bit indicating the presence or absence of data blocks, and a reception confirmation ACK (ACKnowledge) bit. The block of initial data is called a header block and consists of respective four-bit logical addresses indicating the transmitting party (i.e. the logical address of a piece of first AV equipment) and receiving party (destination, i.e. the logical address of a piece of second AV equipment) of the CEC message, the following data block 1 taken to be operation codes serving as control data and data block 2 and upward similarly taken to be operands serving as control data. Specifically, the control data are constituted by these operating codes and operands. FIG. 4 shows an example of sending a header block and three data blocks. In FIG. 4, since the transmission time of each data block is taken to be 24 ms, each bit corresponds to 2.4 ms, one tenth thereof.

If the transmission direction from wireless video transmission device 110 to wireless video reception device 120 in FIG. 1 is defined to be the downlink, and the reverse direction is defined to be the uplink, the video frame signals are taken to be transmitted unidirectionally in the downlink and CEC messages are taken to be transmitted bidirectionally, in both the uplink and the downlink. A wireless transmission and reception part 215 in FIG. 3 transmits control data including downlink video frame signals and uplink and downlink CEC messages by time multiplexing. In Part (2) of FIG. 4, there is shown an example in which downlink CEC messages 41 to 44 are inserted during vertical retrace intervals with respect to the downlink video frame signals. In FIG. 4, there is shown an example in which the vertical scanning frequency of the video frame signals is 60 Hz, i.e. the vertical scanning period of the video frame signal is 16.7 ms. Using the sequence of FIG. 4, the operation and function of each element in the CEC processing block shown in FIG. 3 will be explained below. Hereinafter, it is chosen to carry out an explanation of FIG. 3 taking as an example the case in which a digital broadcast received with STB 114 in first CEC system 11 is recorded with HDD recorder 123 in second CEC system 12.

From STB 114, which is a piece of first AV equipment, there is issued a CEC message, such as shown in Part (1) of FIG. 4 and including: control data including a recording command for recording a received digital broadcast, "Tuner 2" which is the logical address of the concerned STB 114, and further, the logical address "Recorder 2" of the destination (the piece of second AV equipment under control). Here, the logical address "Recorder 2" of the destination included in the CEC message is a logical address provided virtually, taking HDD recorder 123 to be one incorporated in wireless video transmission device 110. Consequently, in the case where e.g. there exist one HDD recorder each in both the first and the second CEC systems, the HDD recorder logical address provided virtually in the first CEC system is set to be different from the logical address of HDD recorder 123 actually provided inside second CEC system 12.

A CEC reception part (211) receives the concerned CEC message from STB 114 and outputs this to a filter 212. Filter 212 determines, using an address table 218, which is an address storage part, whether the destination logical address "Recorder 2" recorded in the header is present inside first CEC system 11. In the address table, there is recorded and stored a correspondence table, shown in FIG. 2, including physical addresses and logical addresses. In the case where the destination exists not in first CEC system 11 but in second CEC system 12, the wireless connection destination, only CEC messages destined for the concerned second CEC system 12 are input into FIFO (First In First Out) memory 213. In this example, it is determined, since (0, 0, 0, 0) is given as the physical address corresponding to the logical address "Recorder 2", that the destination logical address "Recorder 2" included in the received CEC message does not exist in first CEC system 11 but in the exterior thereof, i.e. in second CEC system 12. Due to such a determination of the destination, the destination logical address is input into the FIFO memory after reception of at least all the information bits of the header block.

By controlling the data readout timing to FIFO memory 213, an adjustment of the timing of the wireless output of the CEC message is carried out. As for the CEC message read out from FIFO memory 213, control information such as an identification signal of wireless video transmission device 110 and an identification signal of wireless video reception device 120 of the addressee, is added in a control information addition part 214 and is input into wireless transmission and reception part 215. Wireless transmission and reception part 215 transmits the CEC message wirelessly to wireless video reception device 120 together with the video frame signal, in the sequence shown in Part (2) of FIG. 4.

Here, wireless transmission and reception part 215, after receiving the header block data up to at least the information bits and the EOM, sends, with the timing of the vertical retrace interval of the arriving video frame signal, a wireless packet 41 in which control information is added to the data of the header block and which reaches wireless video reception device 120.

Since a CEC processing block with a configuration similar to that in FIG. 3 is provided inside wireless video reception device 120, an explanation of the operation and function of the CEC processing block in wireless video reception device 120 will be given using the reference numerals of FIG. 3.

The identification signal of the wireless video transmission device of the transmitting part is separated, with a control information extraction part 223, from wireless packet 41 received with wireless transmission and reception part 215 inside wireless video reception device 120 and input into an address conversion part 222. Address translation using this identification signal is one used in the case where e.g. plural first CEC systems 11 exist. E.g., the address table corresponding to each of the first CEC systems is associated preliminarily with the identification signal of the wireless video transmission device of the same CEC system 11 and the address table corresponding to CEC system 11 including the concerned wireless video transmission device is selected from the extracted identification signal of the wireless video transmission device with the aforementioned control information extraction part 223. Address conversion part 222 carries out address conversion using the same selected address table. Address conversion part 222 converts the logical addresses of the transmitting party and receiving party of the CEC message on the basis of address table 218 and transfer the same to FIFO memory 221. In this example, since the logical address of HDD recorder 123 included in the CEC message received with wireless transmission and reception part 215 is "Recorder 2", address conversion part 222 converts this into "Recorder 1", which is the actual logical address given to HDD recorder 123.

The delivery timing of the CEC message is adjusted in FIFO memory 221 and it is delivered as a header block 51 from a CEC transmission part 220 to HDD recorder 123 connected by HDMI wire with wireless video reception device 120.

As for the data blocks of Part (1) of FIG. 4, if filter 212 of wireless video transmission device 110 lets through the immediately preceding header block, there is adopted a mechanism by which, in case the EOM bit of the previous block is "1", the data blocks following the concerned EOM bit are let through and this string of data having transited the filter is input into FIFO memory 213. After the information bits and EOM bit of data block 2 have been prepared, they are delivered from wireless transmission and reception part 213 together with the added control information as a wireless packet 42, with the timing of the vertical retrace interval of the incoming video frame signal.

Wireless video reception device 120 delivers the CEC message obtained from the received wireless packet 42 as a data block 52 to the piece of AV equipment connected by wire with the concerned wireless video reception device 120. Data block 1 is an operation code, so since a logical address or physical address is not included, there is no need for address translation.

Due to the fact that it is necessary to concatenate header block 51 and data block 52, that the CEC message comes in data blocks every 24 ms, and further that video information comes every 16.7 ms, and that there come vertical retrace intervals during which a control signal including the CEC message is transmitted and received, there is a need to take the final timing of data block 52 to be a timing position delayed by more than two vertical scanning periods, from the timing position at which wireless packet 41 is sent. Since it is desirable to relay the CEC message as rapidly as possible, it is preferable for the delay timing to be on the order of two vertical scanning periods.

Hereinafter, data block 2 and data block 3 are transmitted consecutively. At this time, there are cases where, according to the operation code included in data block 1, data block 2 and data block 3, being operands, are physical addresses or logical addresses. In this case, it is acceptable to devise the system so as to check the concerned operation code against a command table 217 and extract it and to look up the physical address or logical address recorded in data block 2 or data block 3, being operands, in address table 218 and perform conversion operation on the address conversion part 222.

Additionally, the final timing of data blocks 53, 54 is similar to that of the data block 52 as described above.

Figure 5:
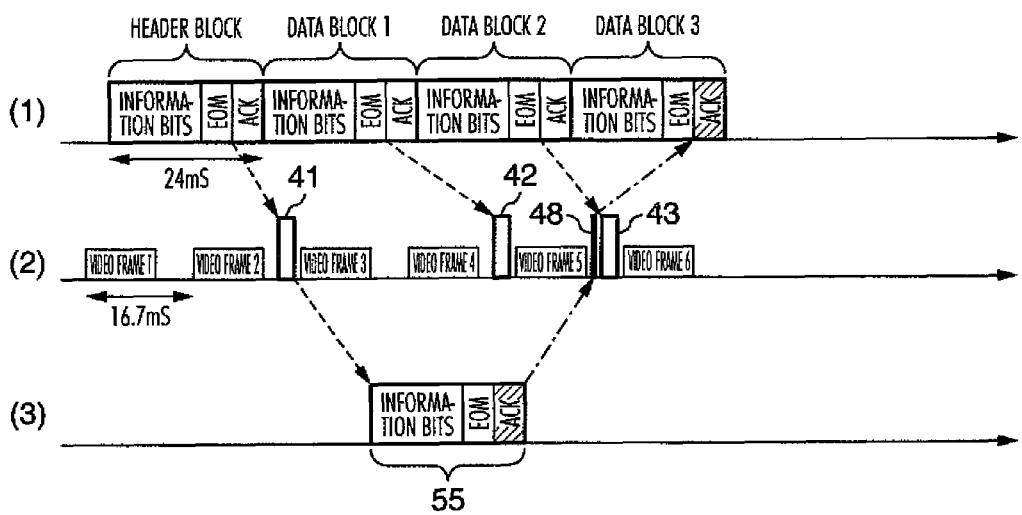
FIG. 5 is a sequence diagram showing the signals of each part of a wireless communication system in the case where no reception confirmation ACK bit is returned from the destination of a CEC message (Embodiment 1).

Next, an explanation regarding the reception confirmation ACK bit will be given using FIG. 5. FIG. 5 is a sequence diagram showing the signals of each part of a wireless communication system in the case where no reception confirmation ACK bit is returned from the destination of a CEC message. Elements operating in the same way, or having the same function as in FIG. 4 are given the same reference numerals. Further, in the example below, it is assumed that "0" is returned for the ACK bit in the case of confirming reception of the CEC message and that "1" is returned in the case where reception could not be confirmed.

In Part (1) of FIG. 5, there is a need to return a reception confirmation ACK bit of "0" when wireless video transmission device 110 receives a header block from a piece of first AV equipment connected by wire with the concerned device 110. Because of this, an ACK control circuit 216 searches the address 218 for the logical address of the destination (the piece of second AV equipment under control) included in the information bits of the header block and, in the case where the concerned logical address has been found inside second CEC system 12 of the wireless receiving party, chooses the ACK bit to be "0" and makes a proxy reply.

Wireless video reception device 120 transmits the header block including this ACK bit as a header block 55 via wireless packet 41 to the piece of AV equipment connected by wire. At this point, if the destination piece of AV equipment is removed, it is seen that reception has not been possible since the reception confirmation ACK bit becomes "1". The information that this reception has not been possible is sent, as wireless packet 48, to wireless video transmission device 110 at the timing position of the vertical retrace interval coming next. Wireless video transmission device 110 extracts the concerned information in control information extraction part 223 and deletes the physical address and logical address of the concerned piece of AV equipment from the address table.

In the case where the updated logical address is the logical address of a CEC message currently being received, it is possible, by leaving the following reception confirmation ACK bit as is at "1" without returning it, to promptly transmit, to the transmitting piece of AV equipment, the fact that the CEC message has not arrived. If transmitting wirelessly after the entire CEC message has been received, control becomes simpler, but there necessarily occur reception confirmation ACK bit proxy reply misses, so by sending byte by byte, it is possible to reduce the proxy reply misses.

Further, taking the case where the reception confirmation bit does not arrive, it sometimes occurs that reception confirmations bits are temporarily not returned, due to noise intermixed in the cable or equipment operation problems. Providing for the same case, it is acceptable to immediately not correct address table 218 and to wait once more or to wait for a correction until the allowed number of CEC message retransmissions of 5 has been reached. Even in this case, it is better not to make a reception confirmation bit proxy reply to the transmitting piece of AV equipment.

Also, in case the reception confirmation bit does not arrive after a designated time of 0.5 seconds to several seconds has elapsed, the wireless video reception device may send an existence check message to the destination piece of AV equipment.

In the foregoing, a CEC message transmission from wireless video transmission device 110 to wireless video reception device 120 was taken as an example, but the case of CEC message transmission from wireless video reception device 120 to wireless video transmission device 110 is similar.

<<2. The Second Embodiment>>

Figure 6:
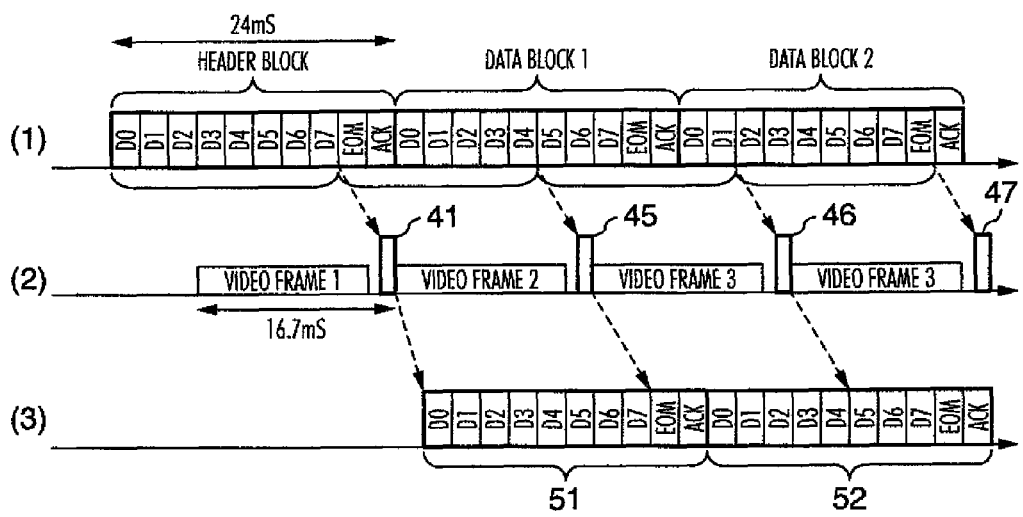
FIG. 6 is a sequence diagram showing the signals of each part of a wireless communication system (Embodiment 2).

Next, an explanation of Embodiment 2 of the present invention will be given using the sequence diagrams of FIG. 6 and FIG. 7. Since the equipment configuration is the same as that of Embodiment 1, an explanation thereof is omitted. In Embodiment 2, by transmitting CEC messages wirelessly by dividing them up not in units of one byte but in bit units, the responsiveness of reception confirmation ACK bits is further improved, the data inside the information bit groups being expressed in bit units.

After reception of the previous information bits including at least the destination bits, header block 1 is transmitted as wireless packet 41 inserted in the vertical retrace interval. With wireless packet 45 of the following vertical retrace interval, the EOM bit of the header block and the D0 to D5 data bits of data block 1, received up to that point, are transmitted to wireless video reception device 120. As for header block 51 sent out by the wireless video reception device, the D7 bit thereof may have the timing at which the preparation of the EOM bit generated from wireless packet 45 is complete. In this way, if one chooses to send in bit units, there is the effect that it is possible to further shorten the CEC message delay, since for each video vertical scanning period, the respective CEC message bits are gradually sent. Further, in the case where logical addresses and the like to be converted are included in the data blocks, the delivery of the CEC message may be delayed by the time portion corresponding to the processing thereof. Additionally, since wireless packets 46, 47 are similar to the wireless packet 45, the detail explanations of the wireless packets 46,47 are omitted.

Figure 7:
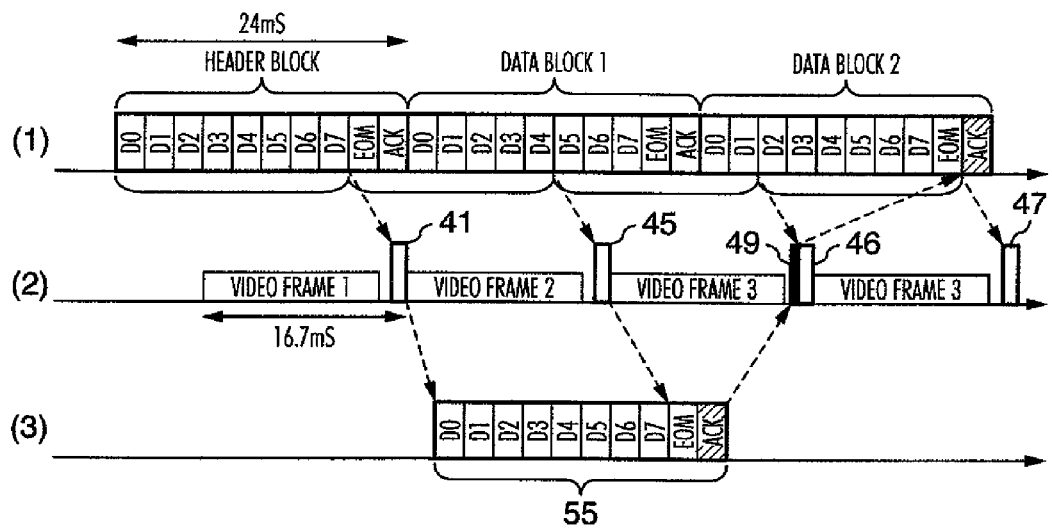
FIG. 7 is a sequence diagram showing the signals of each part of a wireless communication system in the case where no reception confirmation ACK bit is returned from the destination of a CEC message (Embodiment 2).

FIG. 7 is a sequence diagram showing a case in which the AV equipment to be received is removed and the reception confirmation ACK bit does not come back. The operation is the similar to that of FIG. 5, but since the CEC message is sent by being divided up in bit units, the information that the piece of AV equipment has been removed is promptly communicated to wireless video transmission device 110, so it is possible to halt the reception confirmation ACK bit proxy reply to the transmitting piece of AV equipment. (Refer to the wireless packet 49 of FIG. 7.)

<<3. The Third Embodiment>>

Figure 8:
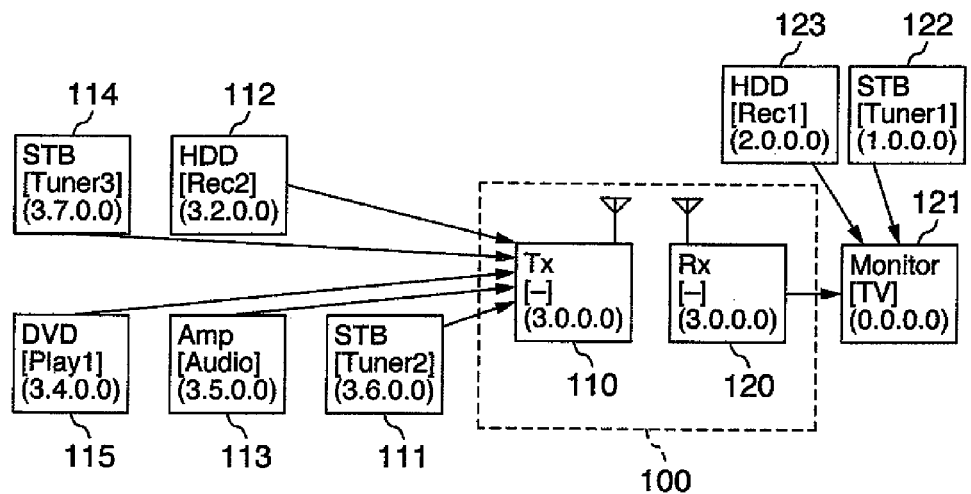
FIG. 8 is a block diagram showing the configuration of a system in which there are assumed pieces of AV equipment that are connected by wire with a wireless video reception device (Embodiment 3).

Embodiment 3 of the present invention will be explained using FIG. 8. FIG. 8 is a block diagram showing the configuration of a system in which there are assumed pieces of AV equipment that are connected by wire with a wireless video reception device. Embodiment 1 was one in which a piece of AV equipment inside CEC system 11 is made to exist virtually inside the wireless video reception device in second CEC system 12. In FIG. 8, there is assumed a form where the equipment inside second CEC system 12 is connected directly with a wireless communication system 100 composed of wireless video reception device 120 and wireless video transmission device 110.

By treating the input terminal number as a logical address number and taking the second digit of the physical address to be the logical address, it is possible to simplify the conversion table. If simplification is not of concern, other ways are acceptable, such as allocating number in the order in which the pieces of AV equipment have been recognized. In FIG. 9, logical address numbers expressed with four bits are indicated with the numbers on the right of the double arrows in the column expressing the logical addresses. It can be read that the virtual logical addresses and the second digits of the physical addresses, recorded inside the double frames of CEC system 12, coincide.

By making a connection directly with wireless communication system 100, there is avoided the risk that, if too many functions are incorporated inside one piece of AV equipment, there is too much to handle inside the piece of AV equipment.

<<4. The Fourth Embodiment>>

Figure 10:
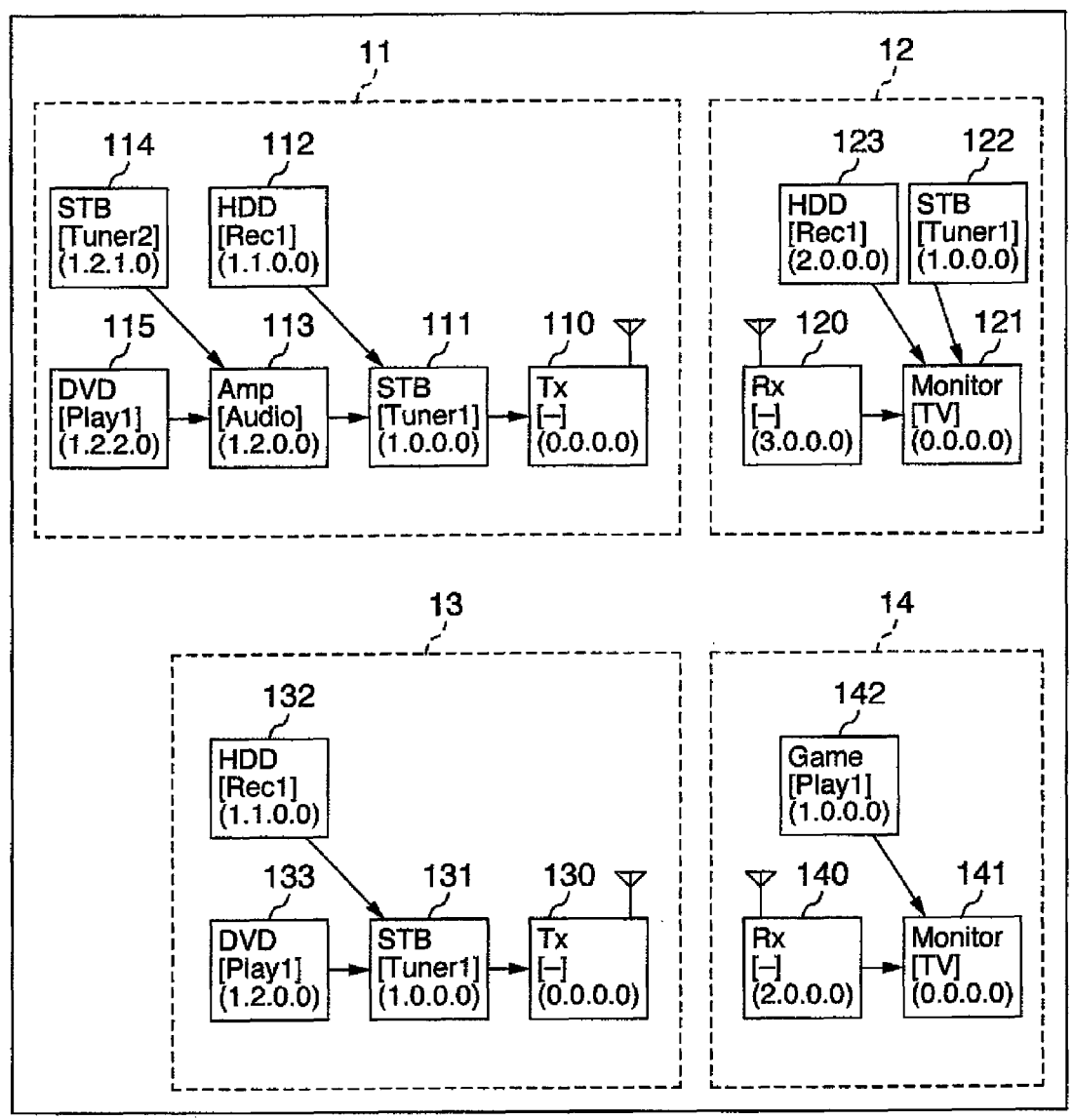
FIG. 10 is a block diagram showing the configuration of a system in which AV equipment is connected by wire and wirelessly (Embodiment 4).

Embodiment 4 of the present invention will be explained using FIG. 10. FIG. 10 is a block diagram showing the configuration of a system in which AV equipment is connected by wire and wirelessly. In Embodiment 1, a case of one each of the wireless video transmission devices and the wireless video reception devices was shown, but in FIG. 10, an example of two each of the devices is shown. To the block diagram in FIG. 1, there are added a CEC system 13 including a wireless video transmission device 130 and a CEC system 14 including a wireless video reception device 140. The CEC system further includes a STB 131, an HDD 132 and a DVD 133. The CEC system 14 further includes a Monitor 141 and a Game 142.

In the CEC systems, either CEC system 12 or 14 is selected in advance since there can only exist one TV set. The conversion table in the case where CEC system 12 is selected is shown in FIG. 11. The portions shown with double borders indicate virtually allocated physical addresses and logical addresses. The virtual physical addresses inside CEC system 12 are similarly in Embodiment 3 made to coincide with the logical addresses.

As for CEC system 11 or CEC system 13, since either has a form in which the AV equipment is connected to a wireless video transmission device having a real physical address of (0, 0, 0, 0), the conversion table is simplified by, after choosing numbers for the first digit in the virtual physical addresses which do not conflict with the real physical addresses, reflecting the real physical addresses for the second and higher digits.

If the control rights shift from CEC system 12 including wireless video reception device 120 to CEC system 13 including video reception device 140, the conversion table of wireless video transmission devices 110 and wireless vide reception devices 120 gets switched as shown in FIG. 12. As mentioned above, such a switchover utilizes the identification signals of wireless video transmission devices 110 and wireless video reception devices 120. Since there is no change in the conversion table between CEC systems 11 and 13, which continue to be connected, reconstruction of the conversion table is kept to a minimum, so high-speed switchovers become possible.

The video frame signals shown in the sequence diagrams of FIG. 4 and so on are adjusted to the video output timing of wireless video transmission device 110 or that of the devices which is actually transmitting video images of the wireless vide transmission device and vertical retrace intervals in which CEC messages are inserted are allocated in sequence to each of the wireless video transmission devices or wireless video reception devices. One retrace interval may be divided into three, or three retrace intervals may be used in sequence. Further, vertical scanning periods may be divided up and wireless packets including control data including CEC messages may be disposed in the divided vertical scanning periods.

In the aforementioned explanation, there was shown an example in which the physical address of wireless video transmission device 110 was fixed to (0, 0, 0, 0), but it may also be set to other addresses, such as e.g. (1, 0, 0, 0). Also, it is acceptable to introduce the initially combined wireless video reception device physical address and fix it until power off or until it is initialized.

Further, the conversion table is initially set after the power supply of each of the wireless video transmission devices or wireless video reception devices has been launched, is eliminated in case there is no ACK bit reply for reception confirmation and is added upon the connection of a piece of AV equipment. However, even in other than such cases, it is acceptable to send only the header portion to ascertain whether the AV equipment connection is alive at intervals of 0.5 seconds to several seconds to make updates regularly.

Further, in the aforementioned embodiment, an explanation was given with the example of transmitting a CEC message from a wireless video transmission device to a wireless video reception device, but since it is evident that operation would performed in a similar way in the case of on the contrary transmitting the CEC message from the wireless video reception device side to the wireless video transmission device side, a detailed explanation thereof will be omitted.

In accordance with the control method of a wireless communication system, related to the present invention, consisting of a wireless video transmission device and a wireless video reception device, it is possible to shorten the time of reconstructing the CEC system even in the case where the connection relationship of the wireless video reception device or a piece of AV equipment linked therewith has changed, so CEC messages defined in the HDMI Specification can be sent with little delay. Further, since it is possible to transmit video frame signals and CEC messages with time division, the wireless transmission and reception part can be configured at low cost.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless video transmission device, connected by wire with at least a first video equipment, and configured to receive a video frame signal from said first video equipment, and to wirelessly transmit said video frame signal to a wireless video reception device connected by wire with at least a second video equipment, said wireless video transmission device comprising:

a reception unit, configured to receive from said first video equipment: a message including control data for controlling said second video equipment, and a logical address for said second video equipment; and a wireless transmission unit, configured to wirelessly transmit to said wireless video reception device: said message received in said reception unit, together with said video frame signal;

wherein a logical address and a physical address of said first video equipment, and a logical address and a physical address of said second video equipment, are associated and stored in a transmission-side wired network having said wireless video transmission device and a device connected by wire with said wireless video transmission device;

wherein said physical address of said second video equipment in said transmission-side wired network is set to correspond to a physical address of said wireless video transmission device;

wherein said physical address of said wireless video transmission device in said transmission-side wired network is fixed to be a predetermined address; and wherein if said physical address corresponding to said logical address of said second video equipment in said transmission-side wired network, which is contained in said message received by said reception unit and sent from said first video equipment, is set to correspond to said physical address of said wireless video transmission device, then said message is sent from said wireless transmission unit to said wireless video reception device.

2. The wireless video transmission device according to claim 1,
wherein said message is a Consumer Electronics Control (CEC) message defined in an High-Definition Multimedia Interface (HDMI) Specification.

3. The wireless video transmission device according to claim 1,
wherein said physical address of said wireless video transmission device is fixed to a route address (0, 0, 0, 0) as said designated address.

4. The wireless video transmission device according to claim 3,
wherein said message received by said reception unit includes: a header block including a logical address of said first video equipment and said second video equipment, a first data block following said header block, and a second data block following said first data block;
wherein said first data block and second data block are respectively constituted by operation codes and operands as said control data; and
wherein said header block, said first data block, and said second data block are respectively inserted separately in vertical retrace intervals of said video frame signal transmitted wirelessly, and are transmitted to said wireless video reception device by means of said wireless transmission unit.

* * * * *